Dec. 25, 1923.
T. P. HIM
1,478,435
PORTABLE RHEOSTAT FOR ELECTRIC ARC WELDING.
Filed June 13, 1921     3 Sheets-Sheet 1
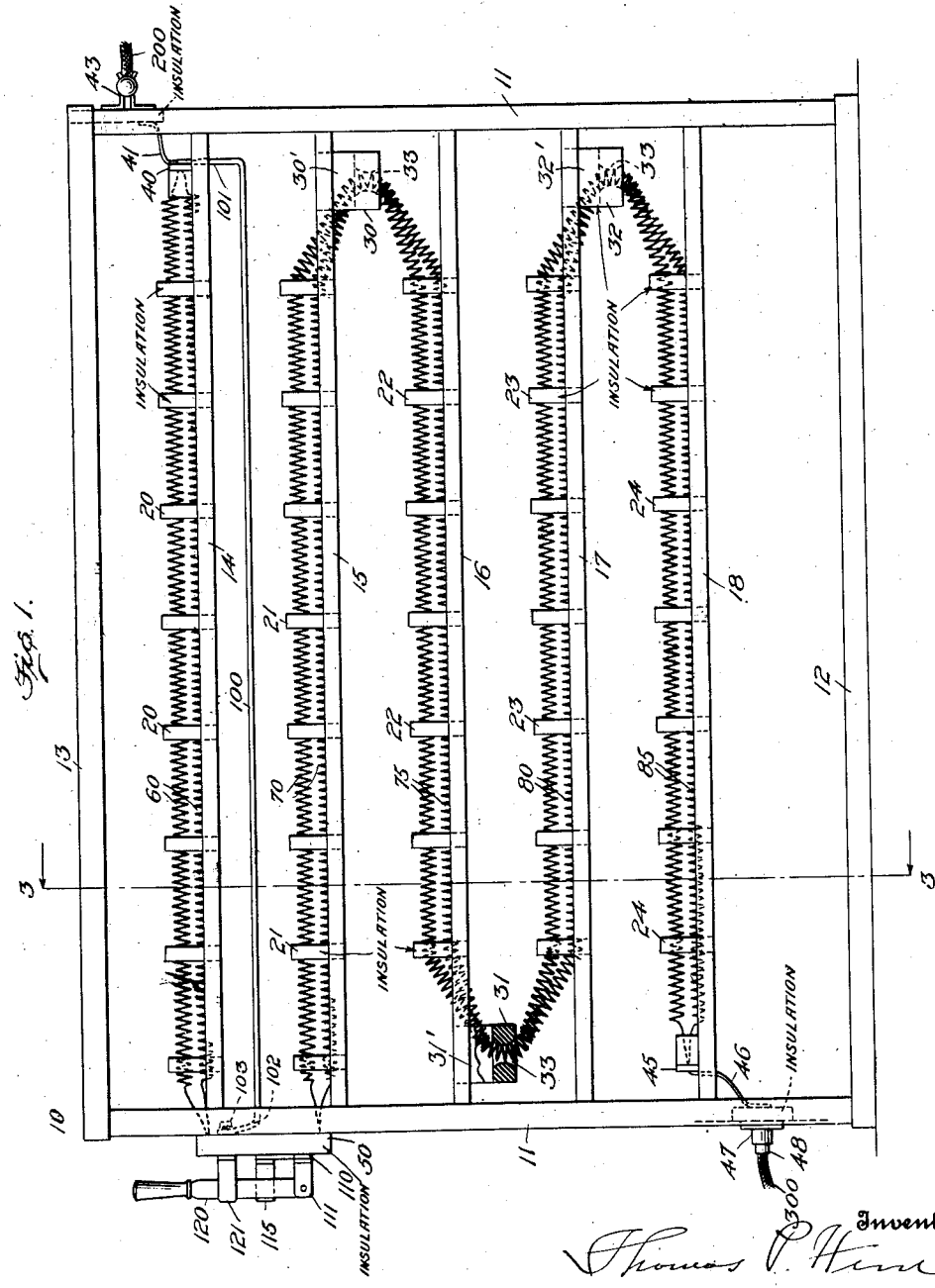

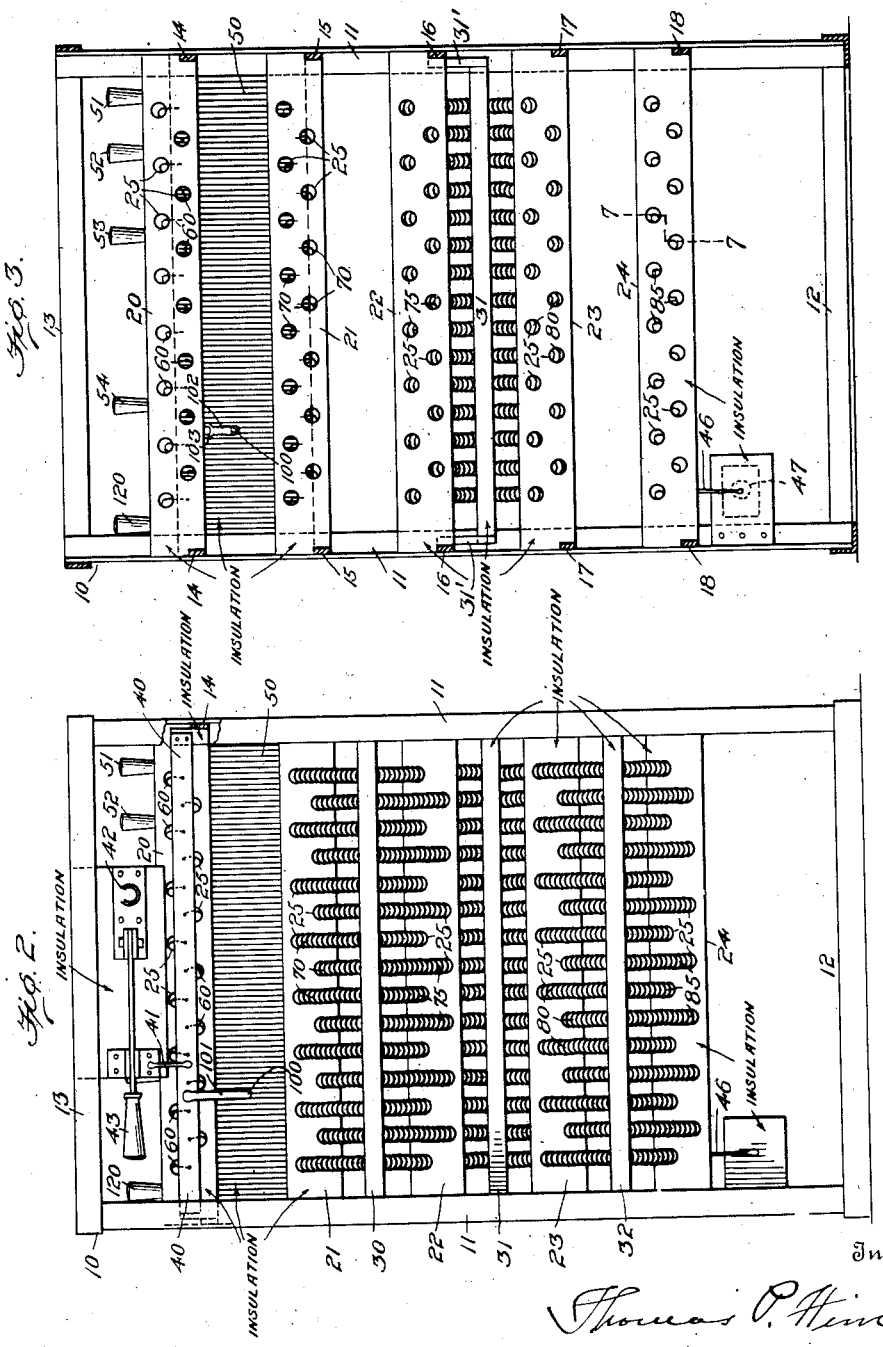

Dec. 25, 1923. 1,478,435
T. P. HIM
PORTABLE RHEOSTAT FOR ELECTRIC ARC WELDING
Filed June 13, 1921   3 Sheets-Sheet 3
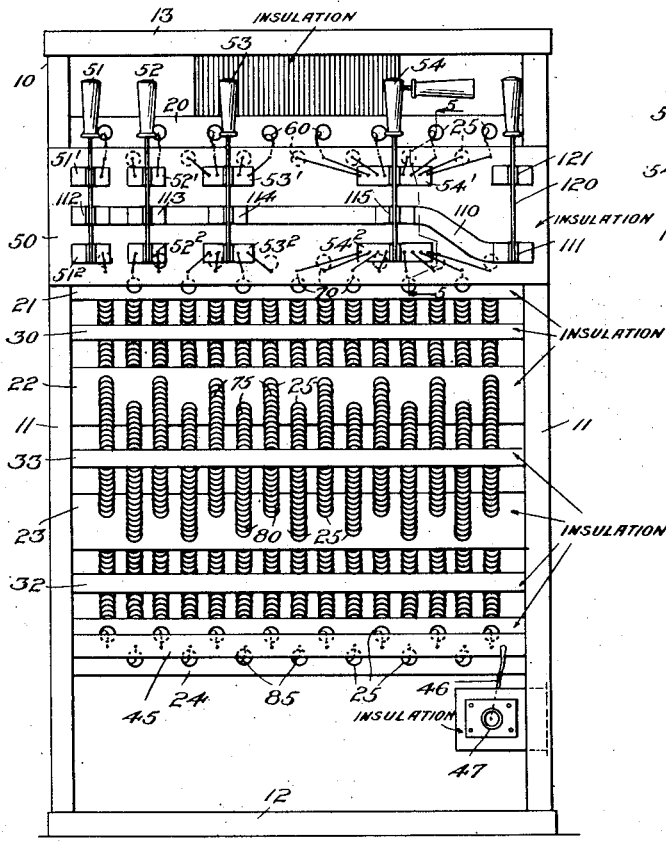
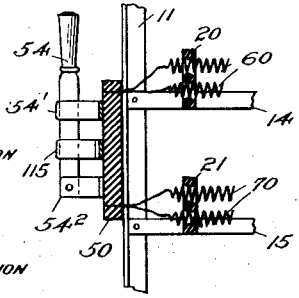
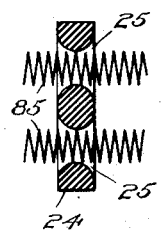
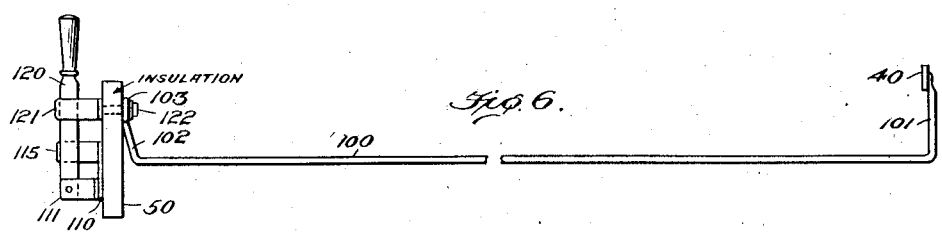
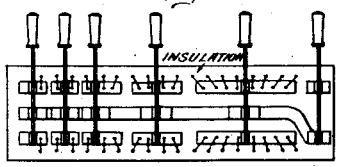
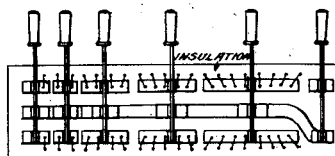
Inventor
Thomas P. Him
By Frank Chase Jones
Attorney Patented Dec. 25, 1923.

1,478,435

UNITED STATES PATENT OFFICE.

THOMAS P. HIM, OF WILKES-BARRE, PENNSYLVANIA.

PORTABLE RHEOSTAT FOR ELECTRIC-ARC WELDING.

Application filed June 13, 1921. Serial No. 477,192.

*To all whom it may concern:*

Be it known that I, THOMAS P. HIM, a citizen of the United States of America, and residing at Wilkes-Barre, in the county of Luzerne, in the State of Pennsylvania, have invented certain new and useful Improvements in Portable Rheostats for Electric-Arc Welding, whereof the following is a specification.

This invention relates to rheostats for reducing the voltage of the ordinary service current, factory current or electric railway current from the high voltage or pressure usual in such currents to the low voltage suitable for welding by the electric arc process. The voltage of electricity used for general purposes varies from 100 volts to 600 volts or higher while the current required in arc welding should have a pressure approximately of 20 volts. To effect such reduction motor generators and rheostats commonly used for this purpose are heavy and unwieldly.

An object of this invention is to provide a portable compact light-weight rheostat adapted to carry the heavy currents passing thru it without overheating and burning off of the conductors. To this end the rheostat embodies fine high resistance conductors together with means for the thoro and complete ventilation and cooling thereof thruout their lengths.

Another object of the invention is to provide a rheostat embodying without complication of structure many multiples of current adjustment affording a wide variety of welding currents, ranging for instance, from a current of 50 amperes to a current of 300 amperes or more. To this end the rheostat embodies a simple arrangement of devices constituting a convenient and flexible system of switching.

Figure 1 of the accompanying drawings represents a side elevation of the preferable embodiment of this invention.

Fig. 2 represents an elevation of the incoming or supply end thereof.

Fig. 3 represents a vertical cross section thereof on line 3—3 of Fig. 1.

Fig. 4 represents an end elevation of the outgoing or delivery end of the rheostat, showing the conductors connected to the regulating switches of the main switchboard in groups arranged in geometrical progression.

Fig. 5 represents a fragment of the rheostat, showing a cross section of the main switchboard on line 5—5 of Fig. 4.

Fig. 6 represents a detail of the shunt circuit and switch.

Fig. 7 is a transverse section on an enlarged scale of one of the insulator bars thru an upper and lower opening thereof, on line 7—7 of Fig. 3.

Fig. 8 is an elevation of the delivery switchboard and its switches in a modified construction, showing a different grouping of an irregular number of conductors in connection with five regulating switches.

Fig. 9 is an elevation of the delivery switchboard and its switches in another modification, wherein twenty conductors are grouped for five regulating switches.

The same reference numbers indicate corresponding parts in the different figures, round numbers being used for the principal elements and generally speaking intermediate numbers for subordinate features thereof.

The illustrated embodiment of this invention comprises a skeleton frame 10 preferably constructed of metal in rectangular form and composed of corner posts 11, connecting sills 12 and connecting top bars 13. This frame is provided with several pairs of longitudinal side bars 14, 15, 16, 17 and 18 connected at their opposite ends to corner posts and disposed at different elevations, the bars of each pair bearing the same reference number being preferably on the same horizontal plane.

A set 20 of insulator bars is supported on the topmost side bars 14 and similar sets 21, 22, 23 and 24 are supported on the side bars 15, 16, 17 and 18 respectively. The insulator bars of these several sets are disposed transversely of the frame apart from one another and rest at their opposite ends on said side bars. Each of said insulator bars is set edgewise and provided with horizontal holes or eyes 25 arranged in a plurality of rows disposed one above another in staggered relation, the eyes of the upper row being opposite the spaces between the eyes of the lower row. Each eye 25 is flared in both directions to opposite faces of the bar as shown in Fig. 7. The bars are constructed of insulating material or the eyes are lined therewith. The intermediate transverse insulator bar 30 is supported near the front end of the frame between the set of insulator bars 21 and the set of insulator bars 22 by lugs 30' dependent from the side bars 15. A similar intermediate insulator bar 31 is supported near the rear end of the frame between the set of insulator bars 22 and the set of insulator bars 23 by lugs 31' attached to the side bars 16; and a similar intermediate transverse insulator bar 32 is supported between the series of insulator bars 23 and the series of insulator bars 24 by lugs 32' dependent from the side bars 17. These intermediate insulator bars are set flatwise and provided with a single row of holes 33, which are disposed vertically and are also flared in both directions. A bus bar 40 is supported at one end of the frame near the top thereof and connected by a conductor 41 with a socket 42 which is adapted to receive the plug or other terminal of the cable 200 for the incoming current from the electric source. A knife switch or other switch 43 is interposed between said socket and said conductor. A bus bar 45 is supported at the opposite end of the frame near the bottom thereof and connected by a conductor 46 with a socket or other terminal 47 adapted to receive a plug 48 or other terminal of the cable 300 for the outgoing current.

A switch board 50 is mounted at the rear end of the frame about opposite the sets 20 and 21 of the insulator bars. This switch board carries several current regulating group switches 51, 52, 53 and 54 preferably of the knife type.

A bank 60 of resistance conductors is supported by the insulator bars 20. These conductors are composed of spiral coils of high resistance wires disposed in parallel and threaded thru the horizontal eyes 25 of said bars. The ends of these wires which receive the current to be reduced are connected with the bus bar 40 and their delivery ends are separated into independent groups which are connected respectively with the receiving contacts of the several group switches aforesaid. The first "group" is a single wire connected with the contact 51' of the switch 51, the next group contains two wires which are connected with the contact 52' of the switch 52, the next group comprises four wires which are connected with the contacts 53' of the switch 53, the next group is composed of eight wires connected with the contacts 54' of the switch 54. In this embodiment the whole number of conductors wires is 15 and they are here grouped in geometrical progression and connected with four group switches. By this arrangement any number of conductors from one to fifteen may be thrown in circuit by these few switches.

A second bank 70 of resistance conductors, also composed of spiral coils of high resistance wires, has its receiving ends connected in groups with the contacts $51^2$, $52^2$, $53^2$ and $54^2$, of said group switches. These coils are threaded thru the horizontal eyes of the set 21 of insulator bars, thence passed downward thru the eyes of the intermediate insulator bar 30, thence rearward thru the eyes of the set 22 of insulator bars forming a third bank of resistance conductors 75, thence downward thru the eyes of the intermediate bar 31, thence forward thru the eyes of the set 23 of insulator bars forming a fourth bank 80 of resistance conductors, thence downward thru the eyes of the intermediate insulator bar 32 and thence rearward thru the eyes of the set 24 of insulator bars forming a fifth bank or resistance conductors 85. The delivery ends of these wires are connected with the bus bar 45. In the threading of these coils thru the several series or sets of insulator bars alternate spirals are disposed in the lower row of eyes and alternate spirals in the upper row thereof as clearly shown in Figs. 2 and 3.

A shunt circuit is disposed between the banks 60 and 70 of resistance conductors. This shunt circuit preferably includes a shunt bar 100, a shunt bar 110 and a shunt switch 120 adapted to connect and disconnect said shunt bars. The bar 100 extends longitudinally of the frame and is provided at its front end with an upturned portion 101 which is connected with the bus bar 40 and at its rear end with an upturned portion 102 having an eye 103. A shunt bar 110 extends transversely of the frame along the switch board 50 between the stationary members of the knife switches 51 to 55. This shunt bar 110 is provided near its front end with lugs 111 to which the knife contact of the switch 120 is pivoted, and at different points along its length with contact plates 112, 113, 114, 115 and 116. These several contact plates are disposed in alinement respectively with the ordinary contact plates 51' and $51^2$ and 52' and $52^2$ and 53' and $53^2$ of the several group control switches 51 to 54. By this arrangement the knife contacts of said group switches when closed will respectively engage with their normal contact plates 51' to 54' and simultaneously with such normal engagement, they will engage with the shunt contact plates 112 to 115 respectively of said shunt bar 110. The jaw contacts 121 of the switch 120 are provided with an extension 122 which projects thru a hole in the switch board 50 and engages the eye 103 of the shunt conductor 100. A shunt circuit may be interposed between any two of the banks of resistance conductors and two or more shunt circuits may be used in connection with said banks.

The resistance conductors of the several banks aforesaid consist of wires of nickel or alloys of nickel or other high resistance metal. A wire having not more than one-sixtieth the conductivity of copper may be used and a rheostat so constructed will have extreme lightness of weight and yet be capable of passing currents of ordinary voltage for all practical welding purposes. But owing to the heavy current required and the high resistance of the conductors, they are subject to a very high temperature approximately 1600° Fahrenheit; consequently to avoid a disrupting heat the conductors are nowhere inclosed either by insulation or by the supporting devices, and are so arranged as to obtain thoro and complete ventilation and cooling thruout their lengths. The wires of the coils touch their supports lightly where they pass thru the flared holes in the insulator bars and such holes permit the free passage of air currents in contact with the wires.

In the use of this device the current from the source of supply enters the rheostat thru the socket 42 and thence passes thru the switch 43 to the bus bar 40. The current thence flows thru the coils of the resistance conductors of the bank 60; thence thru such of the group switches 51 to 54 as may be closed; thence thru the coils of the bank 70 and the several successive banks 75, 80 and 85, thence thru the bus bar 45 and outward thru the conductor 300 to the arc welder (not shown).

The resistance conductors are of such length and resistance as to reduce the current to the required voltage, and the quantity of current required for any given job is regulated by adjustment of the several group switches 51, 52, 53 and 54. In the illustrated embodiment fifteen conductors are shown and for purposes of explanation it will be assumed that each conductor carries twenty amperes of current when the voltage on the supply line is 600. Then the total capacity of the rheostat, when the current flows thru the full length of the conductors from the bus bar 40 to the bus bar 45 is 300 amperes. If however the current is diverted thru the shunt circuit 100—110 by closing the shunt switch 120 the capacity of the rheostat will be increased to approximately 375 amperes, as the resistance of the first bank of conductors will be practically eliminated.

The regulating group switches are so arranged that by the closing of each one separately or of two or more at the same time a great variety of currents is obtainable. Switch 51 puts one conductor in operation, switch 52 two conductors, switch 53 four conductors and switch 54 eight conductors forming groups in geometrical progression. By various combinations of the several group switches any number of conductors from one to fifteen may be placed in operation. By closing the shunt switch 120 a new series of fifteen different values may be obtained so that by the use of only five control group switches thirty different quantities of current may be obtained, ranging from 20 amperes to 375 amperes, which is ample for all practical purposes.

If it be desired to use a number of conductors not equal to the sum of any geometrical series, a group switch controlling an odd number of conductors is added; for example, if the rheostat has eighteen conductors the groups would be arranged with five group switches with conductor connections as follows: 1—2—3—4—8 as shown in Fig. 8. If the rheostat has twenty conductors the groups will preferably be arranged as follows: 1—2—4—5—8 as shown in Fig. 9.

As the several group switches when closed engage the shunt bar, the same switches control the current whether it flows thru the first bank of conductors or thru the shunt. By this unique arrangement each regulating switch controls its respective conductors thruout their length whether in full circuit or shunted.

The arrangement of the conductors in banks with two tiers to each bank provides accessibility and ventilation which are of prime importance when wires are worked at very high temperature.

By staggering the conductors the up-draft produced by the heating of the air by the conductors, passes not only thru but also around the spiral conductors, thereby providing the maximum of cooling effect, while the greater space between the banks provides ample vent for the heated air and inlet for fresh air. The shape of the holes thru the insulator supports is such as to provide ample ventilation where the conductors pass thru the supports.

I claim as my invention:

1. A rheostat having several substantially horizontal air-exposed banks of resistance conductors arranged one below another and connected in succession.

2. A rheostat having several substantially horizontal air-exposed banks of resistance conductors arranged one below another and connected in succession, each bank comprising two series of coils one above another, the coils of one series being in staggered relation to the coils of the other series.

3. A rheostat comprising a skeleton frame, several series disposed at different levels of horizontal insulator bars, a plurality of banks of air-exposed resistance conductors composed of spiral coils supported by said insulator bars, and terminal conductors with which said wires are connected.

4. A rheostat comprising a skeleton frame, several series disposed at different levels of horizontal bars provided with flaring holes, a plurality of banks of air-exposed resistance conductors composed of spiral coils threaded thru said holes, and terminal conductors with which said wires are connected.

5. A rheostat comprising a skeleton frame, several series disposed at different levels of substantially horizontal insulator bars, a plurality of banks of air-exposed resistance conductors composed of spiral coils supported by said bars, terminal conductors with which said wires are connected, and control switches between any two of said banks with which separate groups of said coils are connected.

6. A rheostat comprising a skeleton frame, several series disposed at different levels of substantially horizontally insulator bars, a plurality of banks of resistance conductors composed of spiral coils threaded thru said holes, terminal conductors with which said coils are connected, and control switches between any two of said banks with which separate groups of said coils are connected.

7. A rheostat comprising a skeleton frame, several series disposed at different levels of substantially horizontal insulator bars, a plurality of banks of resistance conductors composed of spiral coils threaded thru said holes, terminal conductors with which said coils are connected, control switches between any two of said banks with which separate groups of said coils are connected, and intermediate insulator bars between said banks engaged by the wires of said coils for support thereof.

8. A rheostat comprising a skeleton frame, several series disposed at different levels of substantially horizontal insulator bars, a plurality of banks of resistance conductors composed of spiral coils threaded thru said holes, terminal conductors with which said coils are connected, control switches between any two of said banks with which separate groups of said coils are connected, and intermediate insulator bars between said banks provided with vertical holes thru which the wires of said coil are passed between said banks.

9. A rheostat having an insulator bar provided with holes flared in both directions and resistance coils threaded thru said holes.

10. A rheostat having a bank of resistance conductors disposed in separate groups, means for connecting said resistance conductors with the current to be reduced, a second bank of resistance conductors disposed in separate groups, control group switches adapted to act independently to connect and disconnect the respective groups of one of said banks with or from corresponding groups of the other bank, a shunt circuit connected with said means and adapted to be engaged by said group switches, and a shunt switch connected with the resistance conductors of one bank and operative when closed to shunt the current or currents passing thru any or all of said group switches thru said shunt circuit to the second bank of resistance conductors.

11. A rheostat having a bank of resistance conductors arranged in parallel and disposed in separate groups, a bus bar to which the receiving ends of said wires are connected, a second bank of resistance conductors arranged in parallel and disposed in separate groups, control group switches adapted to act independently to connect and disconnect the respective groups of one of said banks with or from the corresponding groups of the other bank, a shunt conductor connected with said bus bar and engaged by said group switches, a shunt switch connected with the resistance conductors of one bank and operative when closed to shunt the current or currents passing thru any or all of said group switches thru said shunt circuit to the second bank of resistance conductors, a delivery bus bar, and means for connecting said second bank of resistance conductors with said delivery bus bar.

THOMAS P. HIM.

Witnesses:
E. L. HOSSLER,
E. A. HOFFMAN.